(12) United States Patent
Miyazato et al.

(10) Patent No.: US 11,807,209 B2
(45) Date of Patent: Nov. 7, 2023

(54) CONTROL DEVICE FOR HYBRID VEHICLE AND CONTROL METHOD FOR HYBRID VEHICLE

(71) Applicant: TOYOTA JIDOSHA KABUSHIKI KAISHA, Aichi-ken (JP)

(72) Inventors: Yoshiaki Miyazato, Shizuoka-ken (JP); Daiki Yokoyama, Gotemba (JP)

(73) Assignee: TOYOTA JIDOSHA KABUSHIKI KAISHA, Aichi-ken (JP)

(*) Notice: Subject to any disclaimer, the term of this patent is extended or adjusted under 35 U.S.C. 154(b) by 39 days.

(21) Appl. No.: 17/510,390

(22) Filed: Oct. 26, 2021

(65) Prior Publication Data

US 2022/0126813 A1    Apr. 28, 2022

(30) Foreign Application Priority Data

Oct. 27, 2020    (JP) .................................. 2020-179804

(51) Int. Cl.
*B60W 20/13*    (2016.01)
*B60W 20/12*    (2016.01)
*B60W 10/06*    (2006.01)
*B60W 10/08*    (2006.01)

(52) U.S. Cl.
CPC ............ *B60W 20/13* (2016.01); *B60W 10/06* (2013.01); *B60W 10/08* (2013.01); *B60W 20/12* (2016.01); *B60W 2510/244* (2013.01)

(58) Field of Classification Search
CPC ...... B60W 20/13; B60W 20/12; B60W 10/06; B60W 10/08; B60W 2510/244
See application file for complete search history.

(56) References Cited

U.S. PATENT DOCUMENTS

| 6,094,618 | A | 7/2000 | Harada |
| 2011/0022260 | A1 | 1/2011 | Ichikawa |
| 2019/0390970 | A1 | 12/2019 | Cha et al. |

FOREIGN PATENT DOCUMENTS

| CN | 108944902 A | * 12/2018 | ............... B60K 6/20 |
| JP | H11115651 A | 4/1999 | |
| WO | 2009122777 A1 | 10/2009 | |

OTHER PUBLICATIONS

Machine Translation of CN108944902A PDF File Name: "CN108944902A_Machine_Translation.pdf".*

* cited by examiner

*Primary Examiner* — Grant Moubry
*Assistant Examiner* — Ruben Picon-Feliciano
(74) *Attorney, Agent, or Firm* — HAUPTMAN HAM, LLP

(57) ABSTRACT

A control device is configured to set a target state of charge of a battery and control an internal combustion engine and rotating electrical machine and the charging and discharging of the battery to make the hybrid vehicle run so that the battery state of charge becomes the target state of charge. The control device is further configured to set the target state of charge based on a remaining distance or required time from a current position up to a restricted zone in which operation of the internal combustion engine is restricted and a grace period from a current time to a time at which the restriction of operation of the internal combustion engine in the restricted zone is started.

7 Claims, 7 Drawing Sheets

__US 11,807,209 B2__

CONTROL DEVICE FOR HYBRID VEHICLE AND CONTROL METHOD FOR HYBRID VEHICLE

RELATED APPLICATIONS

The present application claims priority of Japanese Patent Application No. 2020-179804 filed Oct. 27, 2020, the disclosure of which is hereby incorporated by reference herein in its entirety.

FIELD

The present disclosure relates to a control device for a hybrid vehicle and a control method for a hybrid vehicle.

BACKGROUND

Japanese Unexamined Patent Publication No. 11-115651 discloses a vehicle-mounted control system detecting a current position and a current time of a hybrid vehicle and applying a specific control program when the current position is inside a restricted zone and the current time is inside a restricted time period. Specifically, it discloses a power control program for when the restricted zone is a zone in which an amount of noise or an amount of exhaust gas of a hybrid vehicle is desired to be restricted and for when the specific control program makes the vehicle run by mainly power of an electric motor.

SUMMARY

In a restricted zone in a restricted time period, operation of an internal combustion engine is restricted, so generation of electric power utilizing the power of the internal combustion engine also becomes restricted. For this reason, if not taking into consideration in advance running in a restricted zone in a restricted time period in managing a state of charge of a battery of a hybrid vehicle, it is liable to become necessary to enter a restricted zone in a restricted time period in a state where the state of charge of the battery is not sufficiently secured or it is liable to end up reaching the restricted time period when running in the restricted zone. As a result, in the worst case, the vehicle would be unable to run due to the electric power running out.

The present disclosure was made focusing on such a problem and has as its object to manage a state of charge of a battery of a hybrid vehicle to a suitable state of charge of the battery taking into consideration running in a restricted zone in a restricted time period.

To solve this problem, according to one aspect of the present disclosure, there is provided a control device for a hybrid vehicle. The hybrid vehicle comprises: an internal combustion engine; a battery configured to store electric power generated utilizing power of the internal combustion engine; and a rotating electrical machine configured to be driven by being supplied with one or both of electric power generated utilizing power of the internal combustion engine or electric power stored in that battery. The control device is configured to: set a target battery state of charge; control the internal combustion engine and rotating electrical machine and charging and discharging of the battery to make the hybrid vehicle run so that the battery state of charge becomes the target state of charge; and set the target state of charge based on a remaining distance or required time from a current position up to a restricted zone in which operation of the internal combustion engine is restricted and a grace period from a current time to a time at which the restriction of operation of the internal combustion engine in the restricted zone is started.

Further, according to another aspect of the present disclosure, there is provided a control method of a hybrid vehicle. The hybrid vehicle comprises: an internal combustion engine; a battery configured to store electric power generated utilizing power of the internal combustion engine; and a rotating electrical machine configured to be driven by being supplied with one or both of electric power generated utilizing power of the internal combustion engine or electric power stored in that battery. The control method comprises: setting a target battery state of charge based on a remaining distance or required time from a current position up to a restricted zone in which operation of the internal combustion engine is restricted and a grace period from a current time to a time at which the restriction of operation of the internal combustion engine in the restricted zone is started; and controlling the internal combustion engine and rotating electrical machine and charging and discharging of the battery to make the hybrid vehicle run so that the battery state of charge becomes the target state of charge.

According to these aspects of the present disclosure, it is possible to control an internal combustion engine and rotating electrical machine and charging and discharging of a battery of a hybrid vehicle to make a hybrid vehicle run based on a remaining distance to a restricted zone and a grace period until a time of start of restriction so that a state of charge of the battery becomes a target state of charge set. For this reason, it is possible to manage a state of charge of a battery of a hybrid vehicle to a suitable state of charge of a battery taking into consideration running in a restricted zone in a restricted time period.

DESCRIPTION OF EMBODIMENTS

Figure 1:
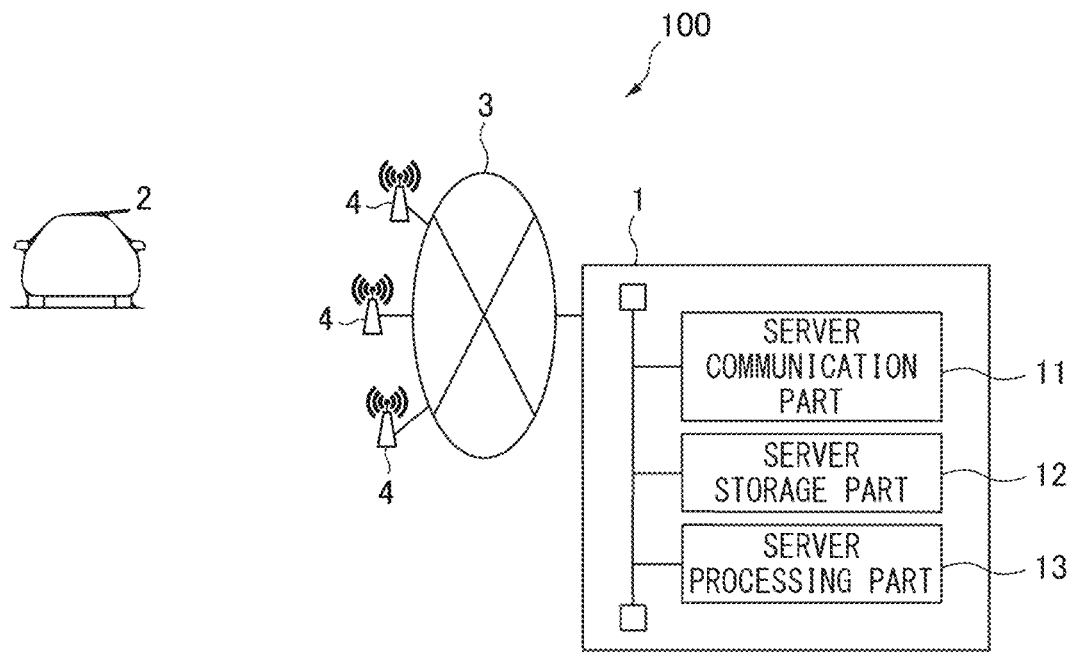
FIG. 1 is a schematic view of the configuration of a vehicle control system according to a first embodiment of the present disclosure.

Below, referring to the drawings, embodiments of the present disclosure will be explained in detail. Note that, in the following explanation, similar component elements are assigned the same reference notations.

First Embodiment

FIG. 1 is a schematic view of the configuration of a vehicle control system 100 according to a first embodiment of the present disclosure.

As shown in FIG. 1, the vehicle control system 100 according to the present embodiment is provided with a server 1 and a hybrid vehicle 2.

The server 1 is provided with a server communicating part 11, server storage part 12, and server processing part 13.

The server communicating part 11 has a communication interface circuit for connecting the server 1 through for example a gateway etc. with a network 3 and is configured to enable mutual communication with the hybrid vehicle 2.

The server storage part 12 has an HDD (hard disk drive) or optical recording medium, semiconductor memory, or other storage medium and stores various computer programs and data etc. used for processing at the server processing part 13.

In the present embodiment, the server storage part 12 stores at least information relating to restricted zones established at different places around the country (information relating to later explained geo fences GF and restricted time periods etc.) A "restricted zone" is a zone in which operation of an internal combustion engine is restricted from the viewpoint of preventing air pollution, preventing noise, etc. If referring to FIG. 2 to simply explain a restricted zone, FIG. 2 shows a geofence GF between an inside and outside of a restricted zone and road positions Kd, Ke, Kf, and Kg positioned on the geofence GF.

Figure 2:
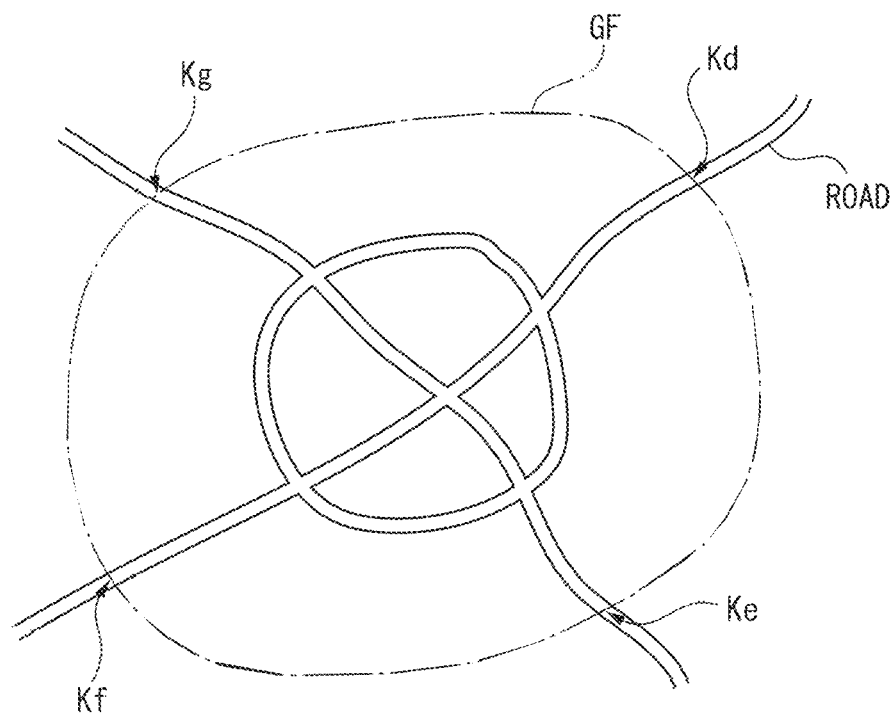
FIG. 2 is a view explaining a restricted zone.

In FIG. 2, the inside of the geofence GF is a restricted zone. If this restricted zone is, for example, a variable type restricted zone enforced for only a preset restricted time period, operation of an internal combustion engine in the restricted zone is restricted only during the restricted time period. In a nonrestricted time period, operation of an internal combustion engine is permitted. The restricted time period is, for example, set in units of hours or days, weeks, months, years, days of week, etc. On the other hand, if the restricted zone shown in FIG. 2 is a fixed type restricted zone where no restricted time period is particularly prescribed, operation of an internal combustion engine is always restricted in the restricted zone.

Returning to FIG. 1, the server processing part 13 has one or more processors and their peripheral circuits. The server processing part 13 runs various computer programs stored in the server storage part 12 and comprehensively controls the overall operation of the server 1. For example, it is a CPU (central processing unit).

Figure 3:
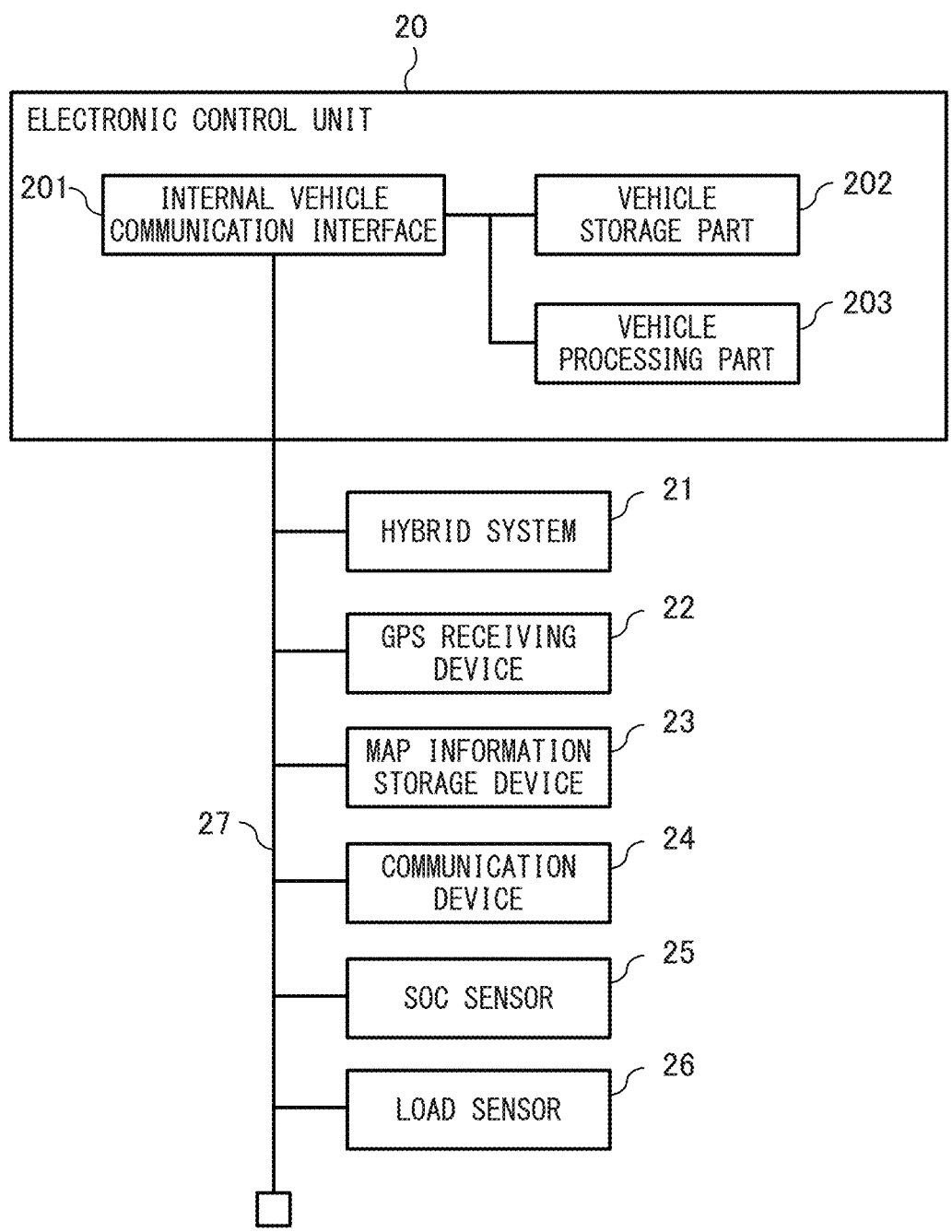
FIG. 3 is a schematic view of the configuration of a hybrid vehicle according to the first embodiment of the present disclosure.

FIG. 3 is a schematic view of the configuration of the hybrid vehicle 2.

As shown in FIG. 3, the hybrid vehicle 2 is provided with an electronic control unit 20, hybrid system 21, GPS receiving device 22, map information storage device 23, communication device 24, and SOC sensor 25 or load sensor 26 or other various sensors. The hybrid system 21, GPS receiving device 22, map information storage device 23, communication device 24, and various sensors are connected through an internal vehicle network 27 based on the CAN (Controller Area Network) or other standard with the electronic control unit 20.

The hybrid system 21 is configured to be able to generate the power required for making the hybrid vehicle 2 run and to transmit the power to the drive wheels. Details of the hybrid system 21 will be explained referring to FIG. 4.

Figure 4:
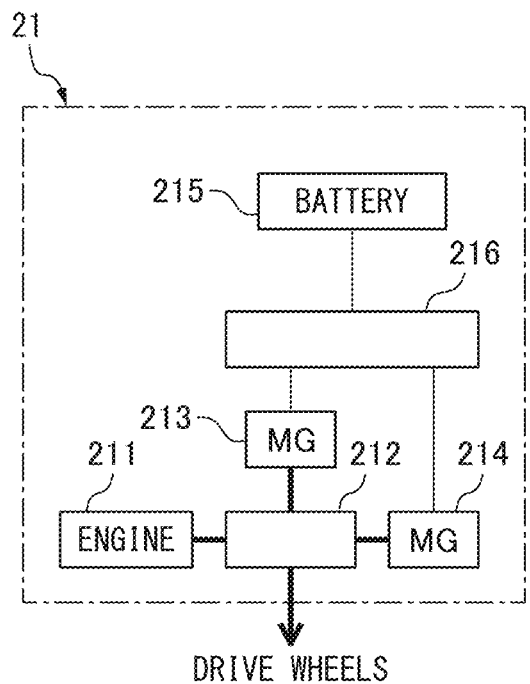
FIG. 4 is a schematic view of the configuration of a hybrid system according to the first embodiment of the present disclosure.

FIG. 4 is a schematic view of the configuration of the hybrid system 21 according to the present embodiment. The hybrid system 21 according to the present embodiment is a so-called series-parallel type of hybrid system, but may also a series type or parallel type or other type of hybrid system.

As shown in FIG. 4, the hybrid system 21 according to the present embodiment is provided with an internal combustion engine 211, a power split mechanism 212, a first rotating electrical machine 213 mainly used as a generator, a second rotating electrical machine 214 mainly used as a motor, a battery 215, and a power control unit (below, referred to as a "PCU") 216.

The internal combustion engine 211 makes fuel burn inside cylinders formed inside it so as to make an engine output shaft coupled with the power split mechanism 212 rotate.

The power split mechanism 212 is a known planetary gear mechanism for splitting the power of the internal combustion engine 211 into two systems of power for making the drive wheels turn and power for driving regenerative operation of the first rotating electrical machine 213.

The first rotating electrical machine 213 is, for example, a three-phase AC synchronous type of motor-generator and has a function as a motor receiving the supply of electric power from the battery 215 to drive powered operation and a function as a generator receiving power of the internal combustion engine 211 to drive regenerative operation. In the present embodiment, the first rotating electrical machine 213 is mainly used as a generator and generates the electric power required for charging the battery 215 and the electric power required for driving powered operation of the second rotating electrical machine 214. Further, it is used as a motor when cranking to make the engine output shaft turn at the time of start of the internal combustion engine 211 and performs the role of a starter.

The second rotating electrical machine 214 is, for example, a three-phase AC synchronous type of motor-generator and has a function as a motor receiving the supply of electric power from the battery 215 to drive powered operation and a function as a generator receiving power from the drive wheels at the time of deceleration of the hybrid vehicle 2 to drive regenerative operation. In the present embodiment, the second rotating electrical machine 214 is mainly used as a motor and generates power for making the drive wheels rotate.

The battery 215 is, for example, a nickel-cadmium storage battery or nickel-hydrogen storage battery, lithium ion battery, or other rechargeable secondary battery. Note that the battery 215, for example, may also be configured to be able to be electrically connected with an external power source so that charging from a household outlet or other external power source becomes possible.

The PCU 216 is provided with an inverter (not shown) and a boost converter (not shown). Its operation is controlled by the electronic control unit 20. Specifically, when using the rotating electrical machines 213, 214 as motors, the operation of the PCU 216 is controlled by the electronic control unit 20 so that the electric power required for driving the rotating electrical machines 213, 214 is supplied from the battery 215 to the rotating electrical machines 213, 214. Further, when using the rotating electrical machines 213, 214 as generators, the operation of the PCU 216 is controlled by the electronic control unit 20 so that the electric power generated at the rotating electrical machines 213, 214 is supplied to the battery 215.

Returning to FIG. 3, the GPS receiving device 22 receives radio waves from artificial satellites to identify the longitude and latitude of the hybrid vehicle 2 and detect the current position of the hybrid vehicle 2.

The map information storage device 23 stores position information of roads and information on the shapes of roads (for example, grades, types such as curves or straight parts, curvature of curves, etc.), position information of intersections and turnoffs, road types, speed limits, and other various road information.

The communication device 24 is a vehicle-mounted terminal having a wireless communication function. The communication device 24 accesses a wireless base station 4 (see FIG. 1) connected through a not shown gateway etc. to thereby be connected through the wireless base station 4 with the network 3. Due to this, it communicates with the server 1.

The SOC sensor 25 detects a state of charge SOC of the battery 215 (below, "battery state of charge").

The load sensor 26 detects an output voltage proportional to an amount of depression of an accelerator pedal as a parameter corresponding to the running load.

The electronic control unit 20 is provided with an internal vehicle communication interface 201, vehicle storage part 202, and vehicle processing part 203. The internal vehicle communication interface 201, vehicle storage part 202, and vehicle processing part 203 are connected with each other through signal wires.

The internal vehicle communication interface 201 is a communication interface circuit for connecting the electronic control unit 20 to an internal vehicle network 27 based on the CAN (Controller Area Network) or other standard.

The vehicle storage part 202 has an HDD (hard disk drive) or optical recording medium, semiconductor memory, or other storage medium and stores various computer programs and data used for processing at the vehicle processing part 203 etc.

The vehicle processing part 203 has one or more processors and their peripheral circuits. The vehicle processing part 203 runs various computer programs stored in the vehicle storage part 202 to comprehensively control the hybrid vehicle 2. For example, it is a CPU. Below, the content of the control of the hybrid vehicle 2 performed by the vehicle processing part 203 and in turn the electronic control unit 20 will be explained.

The electronic control unit 20 switches a running mode to either of an EV (electric vehicle) mode or HV (hybrid vehicle) mode to run the hybrid vehicle 2. Specifically, if the battery state of charge SOC is greater than or equal to a mode switching state of charge SOC1, the electronic control unit 20 sets the running mode of the hybrid vehicle 2 to the EV mode, while if the battery state of charge SOC is less than the mode switching state of charge SOC1, it sets the running mode of the hybrid vehicle 2 to the HV mode. Note that the EV mode is sometimes also called a "CD (charge depleting) mode", while the HV mode is sometimes also called a "CS (charge sustaining) mode".

The EV mode is a mode utilizing the electric power of the battery 215 on a preferential basis to drive powered operation of the second rotating electrical machine 214 and transmitting the power of the second rotating electrical machine 214 to the drive wheels to make the hybrid vehicle 2 run.

When the running mode of the electronic control unit 20 is the EV mode, the internal combustion engine 211 is made to stop and in that state the electric power of the battery 215 is utilized to drive powered operation of the second rotating electrical machine 214. Only the power of the second rotating electrical machine 214 is used to make the drive wheels rotate and make the hybrid vehicle 2 run. That is, when the running mode is the EV mode, the electronic control unit 20 makes the internal combustion engine 211 stop and in that state controls the output of the second rotating electrical machine 214 based on the running load to make the hybrid vehicle 2 run so as to obtain the demanded output corresponding to the running load.

The HV mode is a mode controlling the outputs of the internal combustion engine 211 and the second rotating electrical machine 214 to make the hybrid vehicle 2 run so that the battery state of charge SOC is maintained at the state of charge when switched to the HV mode (below, referred to as the "maintained state of charge").

Figure 5:
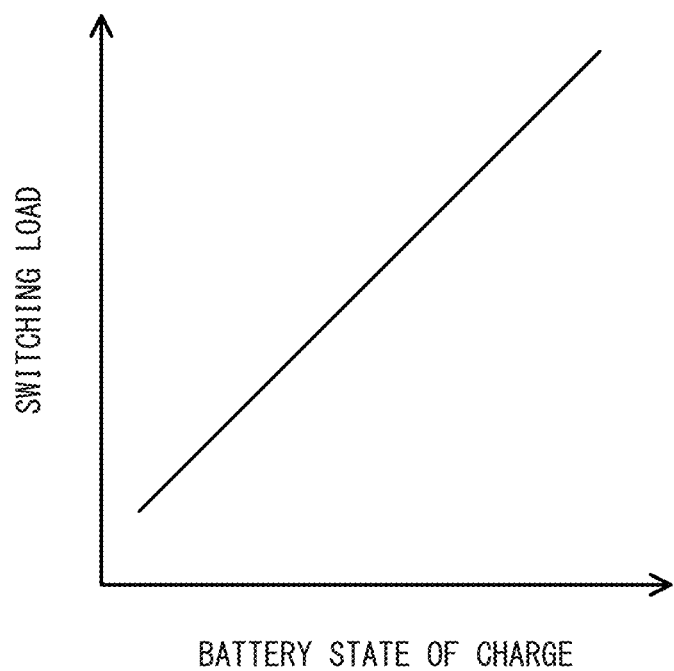
FIG. 5 is a view showing a relationship of a state of charge of a battery and a switching load.

When the running mode is the HV mode, if the running load is less than a predetermined switching load, in the same way as the above-mentioned EV mode, the electronic control unit 20 makes the internal combustion engine 211 stop and in that state uses the electric power of the battery 215 to drive powered operation of the second rotating electrical machine 214 and uses only the power of the second rotating electrical machine 214 to make the drive wheels rotate and make the hybrid vehicle 2 run. Note that, the electronic control unit 20, as shown in FIG. 5, makes the switching load change in accordance with the battery state of charge SOC so that the switching load becomes smaller the smaller the battery state of charge SOC.

Further, when the running mode is the HV mode, if the running load is greater than or equal to the predetermined switching load, the electronic control unit 20 splits the power of the internal combustion engine 211 by the power split mechanism 212 into two systems, transmits one part of the split power of the internal combustion engine 211 to the drive wheels, and uses the other part of the power to drive regenerative operation of the first rotating electrical machine 213. Further, basically, the electric power generated by the first rotating electrical machine 213 is used to drive powered operation of the second rotating electrical machine 214 while supplying part of that electric power to the battery in accordance with need to charge the battery and transmits the power of the second rotating electrical machine 214 to the drive wheels in addition to part of the power of the internal combustion engine 211 to make the hybrid vehicle 2 run.

Further, if the running mode is the HV mode, when the battery state of charge SOC becomes less than the maintained state of charge when the vehicle is stopped, the electronic control unit 20 uses the power of the internal combustion engine 211 to drive regenerative operation of the first rotating electrical machine 213 and uses the electric power generated by the first rotating electrical machine 213 to charge the battery so that the battery state of charge SOC becomes greater than or equal to the maintained state of charge.

In this way, when the running mode is the HV mode, the electronic control unit 20 controls the outputs of the internal combustion engine 211 and the second rotating electrical machine 214 to make the hybrid vehicle 2 run based on the battery state of charge SOC and the running load so that they become the demanded outputs corresponding to the running load. When the running mode switches from the EV mode to the HV mode, if the running load becomes high, the internal combustion engine 211 is started. For this reason, the HV mode is basically predicated on making the internal combustion engine 211 operate and can be said to be a running mode designed to enable the hybrid vehicle 2 to be driven by only the output of the second rotating electrical machine 214 under conditions of a poor thermal efficiency of the internal combustion engine 211.

In this way, in the present embodiment, during the EV mode, the electric power of the battery 215 is consumed to make the hybrid vehicle 2 run until the battery state of charge SOC becomes the mode switching state of charge SOC1. Further, during the HV mode, in accordance with need, electric power generated utilizing the power of the internal combustion engine 211 is charged to the battery 215 while the hybrid vehicle 2 is being run so that the battery state of charge SOC is maintained at the mode switching state of charge SOC1. That is, in the present embodiment, the internal combustion engine 211 and the rotating electrical machines 213, 214 and the charging and discharging of the battery 215 are controlled and the hybrid vehicle 2 run so that the battery state of charge SOC becomes the mode switching state of charge SOC1. Therefore, the mode switching state of charge SOC1 according to the present embodiment can also be called the "target battery state of charge 215" during running of the hybrid vehicle 2.

Here, as explained above, the HV mode is basically a running mode predicated on operating the internal combustion engine 211. Basically the internal combustion engine 211 is started up after the running mode is switched from the EV mode to the HV mode. Further, the EV mode is switched to the HV mode depending on the battery state of charge SOC. In the present embodiment, the running mode is switched from the EV mode to the HV mode when the battery state of charge SOC becomes the mode switching state of charge SOC1. Further, to improve the fuel efficiency, the mode switching state of charge SOC1 is set to a relatively low value (for example, 10% of the full charge etc.) It is desirable to run the vehicle in the EV mode as much as possible.

However, in recent years, sometimes restricted zones explained above referring to FIG. 2 have been established at different locations. If ending up fixing the mode switching state of charge SOC1 at a low value without considering the existence of such restricted zones in control of switching of the running mode, for example, a vehicle is liable to have to enter a restricted zone in a restricted time period in a state running in the HV mode with the battery state of charge SOC fallen, that is, in a state where the battery state of charge SOC is not sufficiently secured. Further, for example, when running in a restricted zone, a nonrestricted time period is liable to be switched to a restricted time period in a state where the battery state of charge SOC is not sufficiently secured.

In a restricted zone in a restricted time period, operation of the internal combustion engine 211 is prohibited, so the vehicle has to be run in the EV mode even in a state where the battery state of charge SOC is not sufficiently secured and the internal combustion engine 211 cannot be operated to charge the battery 215. For this reason, in the worst case, the vehicle is liable to be unable to run due to the electric power running out.

Therefore, in the present embodiment, it was decided to change the value of the mode switching state of charge SOC1 based on the remaining distance from a current position to a restricted zone and the grace period from a current time to a time of start of a restricted time period. Specifically, it was decided to set the mode switching state of charge SOC1 to a higher value the shorter the remaining distance from a current position to a restricted zone and, further, the shorter the grace period from a current time to a time of start of a restricted time period.

Due to this, the closer to a restricted zone and, further, the shorter the grace period, the higher the value the mode switching state of charge SOC1 can be set to and the higher the value the battery state of charge SOC can be maintained at. That is, the higher the possibility of running in a restricted zone in a restricted time period, the higher the value the mode switching state of charge can be set to and the higher the value the battery state of charge SOC can be maintained at. For this reason, it is possible to keep a vehicle from having to run in a restricted zone in a restricted time period in a state where the battery state of charge SOC is not sufficiently secured.

Figure 6:
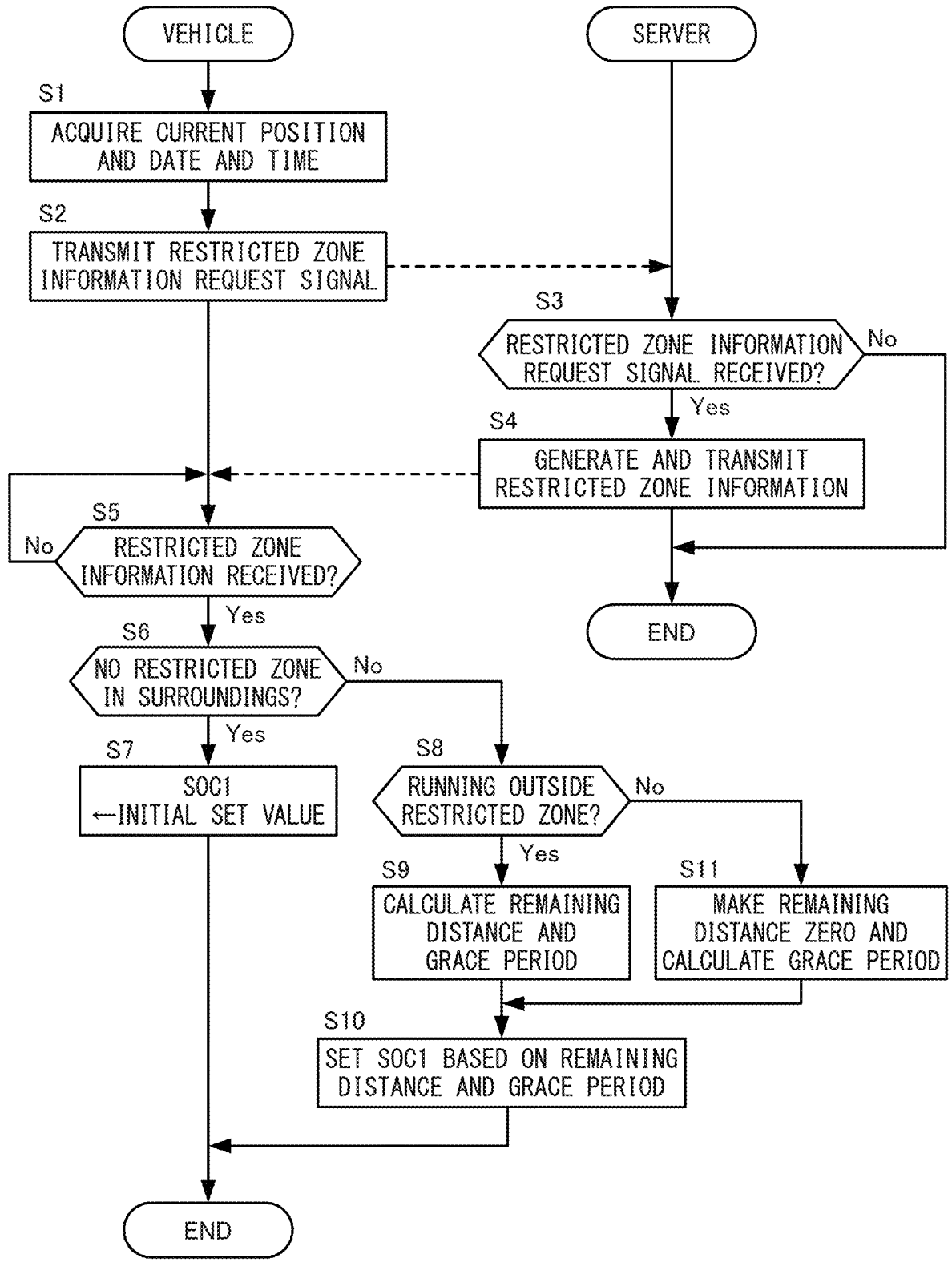
FIG. 6 is a flow chart explaining control for setting a mode switching state of charge according to the first embodiment of the present disclosure.

FIG. 6 is a flow chart explaining control for setting a mode switching state of charge SOC1 according to the present embodiment.

At step S1, the electronic control unit 20 for the hybrid vehicle 2 obtains the current position of the hybrid vehicle 2 based on the position information received from the GPS receiving device 22. Further, the electronic control unit 20 has a clock function (real time clock) and also acquires the current date and time measured by the clock function.

At step S2, the electronic control unit 20 for the hybrid vehicle 2 sends to the server 1 a restricted zone information request signal including an identification number (for example, vehicle number) and current position of the host vehicle so as to acquire restricted zone information. The restricted zone information is information including information relating to whether there is a specific zone in the surroundings of the hybrid vehicle 2, information relating to a geofence GF or a restricted time period of that restricted zone when there is a specific zone in the surroundings, etc.

At step S3, the server 1 judges if it has receive a restricted zone information request signal. If receiving a restricted zone information request signal, the server 1 proceeds to the processing of step S3. On the other hand, if not receiving a restricted zone information request signal, the server 1 ends the current processing.

At step S4, the server 1 generates restricted zone information and transmits it to the hybrid vehicle 2 originating the transmission of the restricted zone information request signal (below, in accordance with need, referred to as the "transmission originating vehicle 2").

Specifically, the server 1 first judges if there is a specific zone in the surroundings of the transmission originating vehicle 2 (for example, in a range of a radius of several kilometers to several tens of kilometers centered about the hybrid vehicle 2) based on the information relating to restricted zones stored in the server storage part 12 and the current position of the transmission originating vehicle 2. Further, the server 1 generates restricted zone information including information of there being no specific region in the surroundings of the transmission originating vehicle 2 if there is no specific region in the surroundings of the transmission originating vehicle 2 and transmits it to the transmission originating vehicle 2. On the other hand, if there is a specific zone in the surroundings of the transmission originating vehicle 2, it generates restricted zone information including information relating to the geofence GF and the restricted time period of that specific zone and transmits it to the transmission originating vehicle 2.

At step S5, the electronic control unit 20 for the hybrid vehicle 2 judges if it has received the restricted zone information. If receiving the restricted zone information, the electronic control unit 20 proceeds to the processing of step S6. On the other hand, if not receiving the restricted zone information, the electronic control unit 20 waits for a certain time period, then again judges if it is receiving the restricted zone information.

At step S6, the electronic control unit 20 for the hybrid vehicle 2 refers to the restricted zone information and proceeds to the processing of step S7 if there is no restricted zone in the surroundings of the host vehicle, while proceeds to the processing of step S8 if there is a restricted zone in the surroundings of the host vehicle.

At step S7, the electronic control unit 20 for the hybrid vehicle 2 makes the mode switching state of charge SOC1 an initial set value. The initial set value is made a relatively low value for improving the fuel efficiency. In the present embodiment, it is made 10% or so of the full charge.

At step S8, the electronic control unit 20 for the hybrid vehicle 2 judges if the host vehicle is running outside of a restricted zone based on the current position of the host vehicle, the map information stored in the map information storage device 23, and the restricted zone information (specifically information relating to the geofences GF of the restricted zones). If the host vehicle is running outside of a restricted zone, the electronic control unit 20 proceeds to the processing of step S9. On the other hand, if the host vehicle is running inside of a restricted zone, the electronic control unit 20 proceeds to the processing of step S11.

At step S9, the electronic control unit 20 for the hybrid vehicle 2 calculates the remaining distance from the current position to a restricted zone and the grace period from the current time to the time of start of a restricted time period. In the present embodiment, the electronic control unit 20 calculates the distances from the current position to road positions Kd, Ke, Kf, Kg located on the geofence GF of the restricted zone (see FIG. 2) and calculates the shortest distance among them as the remaining distance from the current position to the restricted zone.

Figure 7:
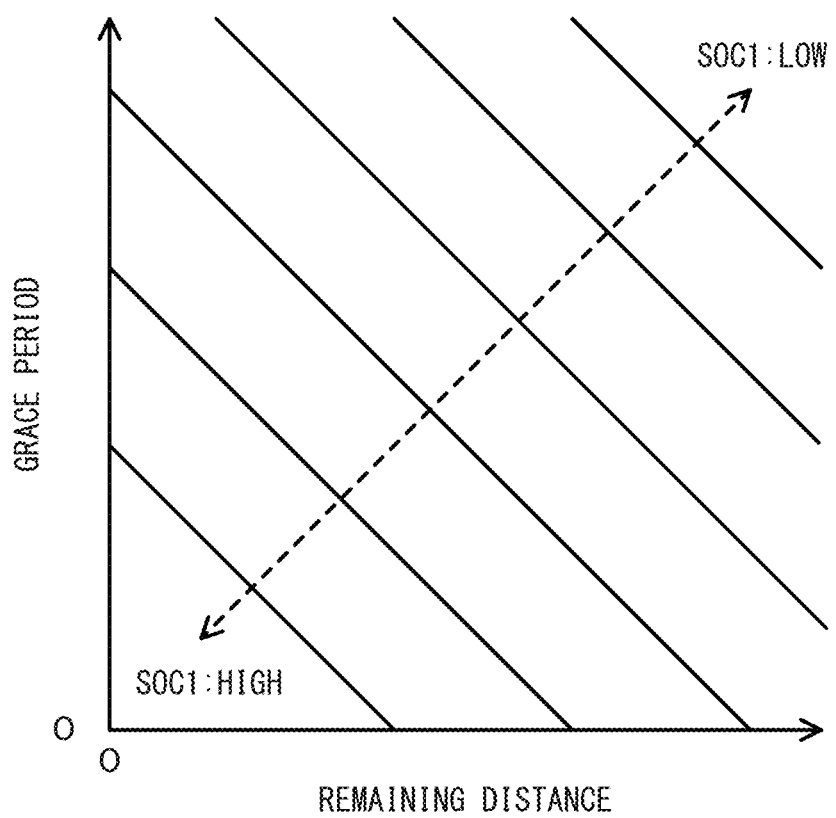
FIG. 7 is a map for setting a mode switching state of charge based on a remaining distance from a current position to a restricted zone and a grace period from a current time to a time of start of a restricted time period.

At step S10, the electronic control unit 20 for the hybrid vehicle 2 refers to the map of FIG. 7 and sets the mode switching state of charge SOC1 based on the remaining distance from the current position to the restricted zone and the grace period from the current time to the time of start of the restricted time period. As shown in the map of FIG. 7, the mode switching state of charge SOC1 is set to a higher value the shorter the remaining distance and further the shorter the grace period.

At step S11, since the host vehicle is running inside of a restricted zone, the electronic control unit 20 for the hybrid vehicle 2 renders the remaining distance from the current position to the restricted zone zero and calculates the grace period from the current time to the time of start of the restricted time period.

The hybrid vehicle 2 according to the present embodiment explained above is provided with an internal combustion engine 211, a battery 215 storing electric power generated utilizing the power of the internal combustion engine 211, and a second rotating electrical machine 214 (rotating electrical machine) driven by being supplied by one or both of the electric power generated utilizing the power of the internal combustion engine 211 and the electric power stored in the battery 215. The electronic control unit 20 (control device) for controlling this hybrid vehicle 2 is provided with a target state of charge setting part setting a mode switching state of charge SOC1 corresponding to a target battery state of charge 215, and a running control part controlling the internal combustion engine 211 and second rotating electrical machine 214 and the charging and discharging of the battery 215 to make the hybrid vehicle 2 run so that the battery state of charge SOC becomes the mode switching state of charge SOC1.

Further, the target state of charge setting part is configured to set the mode switching state of charge SOC1 based on the remaining distance from the current position to a restricted zone in which operation of the internal combustion engine 211 is restricted and the grace period from the current time to a time when restriction of operation of the internal combustion engine 211 is started in the restricted zone.

Due to this, it is possible to control the internal combustion engine 211 and rotating electrical machine 214 and charging and discharging of the battery 215 to make the hybrid vehicle 2 run so that the battery state of charge SOC becomes the mode switching state of charge SOC1 set considering the remaining distance and grace period, so it is possible to manage a suitable battery state of charge SOC taking into consideration running in a restricted zone in a restricted time period.

Further, in the present embodiment, the target state of charge setting part is configured so as to increase the value of the mode switching state of charge SOC1 the shorter the remaining distance and further the shorter the grace period.

Due to this, the closer to a restricted zone and, further, the shorter the grace period, the higher the value the mode switching state of charge SOC1 can be set to and the higher the value the battery state of charge SOC can be maintained at. That is, the higher the possibility of running in a restricted zone in a restricted time period, the higher the value the target battery state of charge 215 can be set to and the higher the value the battery state of charge SOC can be maintained at. For this reason, it is possible to keep a vehicle from having to run in a restricted zone in a restricted time period in a state where the battery state of charge SOC is not sufficiently secured.

Further, in the present embodiment, the target state of charge setting part is configured to make the remaining distance zero when the current position is inside of a restricted zone and to make the shortest distance from the current position to the geofence GF between the inside and outside of the restricted zone the remaining distance when the current position is outside of a restricted zone.

Due to this, it is possible to suitably set the mode switching state of charge SOC1 in accordance with the current position of the hybrid vehicle 2. For this reason, it is possible to even more keep a vehicle from having to run in a restricted zone in a restricted time period in a state where the battery state of charge SOC is not sufficiently secured.

Further, in the present embodiment, the running control part is configured to stop operation of the internal combustion engine 211 and use the electric power of the battery 215 to drive the second rotating electrical machine 214 when the battery state of charge SOC is greater than or equal to the mode switching state of charge SOC1 and to operate the internal combustion engine 211 and use the electric power generated utilizing the power of the internal combustion engine 211 to drive the second rotating electrical machine 214 and charge the battery 215 when battery state of charge SOC is less than the mode switching state of charge SOC1.

Due to this, when the battery state of charge SOC is greater than or equal to the mode switching state of charge SOC1, it is possible to consume electric power of the battery 215 and use the power of the second rotating electrical machine 214 to run the hybrid vehicle 2 so the battery state of charge SOC becomes the mode switching state of charge SOC1, so it is possible to improve the fuel efficiency. Further, when the battery state of charge SOC is less than the mode switching state of charge SOC1, it is possible to use the electric power generated utilizing the power of the internal combustion engine 211 to drive the second rotating electrical machine 214 and charge the battery 215 and to use the power of the internal combustion engine 211 and the second rotating electrical machine 214 to run the hybrid vehicle 2 so that the battery state of charge SOC becomes the mode switching state of charge SOC1.

Second Embodiment

Next, a second embodiment of the present disclosure will be explained. The present embodiment differs from the first embodiment in the content of the control for setting the mode switching state of charge SOC1.

In the above-mentioned first embodiment, when running inside of a restricted zone, the mode switching state of charge SOC1 was set predicated on the vehicle running inside of the restricted zone after that as well. Therefore, if running inside of a restricted zone, the shorter the grace period, the higher the value at which the mode switching state of charge SOC1 was set.

As opposed to this, if the destination is known and the destination is outside of the restricted zone, even if the restricted zone were switched from a nonrestricted time period to a restricted time period while the vehicle was running inside of the restricted zone, so long as a battery state of charge of an extent enabling exit from inside of the restricted zone to outside of the restricted zone were secured, the vehicle would never become unable to run due to the electric power running out.

Therefore, in the present embodiment, it was decided that if running in a restricted zone, when the destination is outside of the restricted zone, it would set the mode switching state of charge SOC1 based on the grace period and a parameter in a correlative relationship with the battery state of charge required for exit from inside of the restricted zone to outside of the restricted zone.

As such a parameter, for example, various parameters expressing the breath of the restricted zone (for example, the area, diameter, etc. of the restricted zone), the remaining distance from the current position inside of the restricted zone to the geofence GF, etc. may be mentioned. This is because the battery state of charge required for exit from inside of the restricted zone to outside of the restricted zone is believed to become higher the broader the restricted zone and, further, is believed to become higher the longer the remaining distance from the current position inside of the restricted zone to the geofence GF.

Due to this, even if the grace period is short, if the battery state of charge required for exit need only be small, it is possible to set the mode switching state of charge SOC1 to a relatively low value. For this reason, it is possible to increase the running distance in the EV mode, so it is possible to keep the vehicle from becoming unable to run due to the electric power running out while possible to improve the fuel efficiency.

Figure 8:
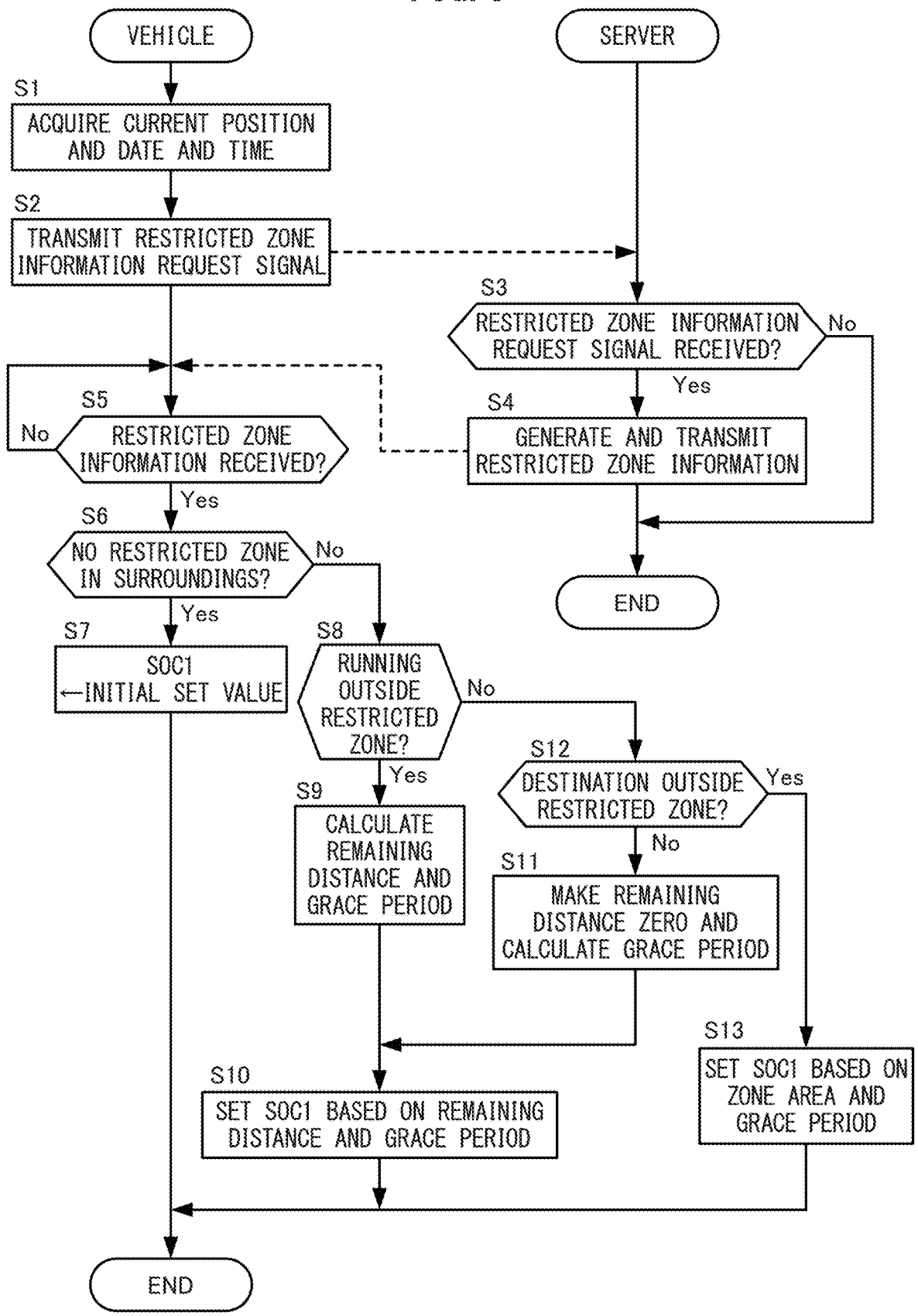
FIG. 8 is a flow chart explaining control for setting a mode switching state of charge according to a second embodiment of the present disclosure.

FIG. 8 is a flow chart explaining control for setting a mode switching state of charge SOC1 according to the present embodiment. In FIG. 8, the processing from step S1 to step S11 is similar to the first embodiment, so explanations will be omitted here.

At step S12, the electronic control unit 20 for the hybrid vehicle 2, for example, judges if the destination of the host vehicle is outside of the restricted zone based on the destination entered into the navigation device (not shown), the map information stored in the map information storage device 23, and restricted zone information (specifically information relating to the geofence GF of the restricted zone). If the destination has not been entered or if the destination is inside of the restricted zone, the electronic control unit 20 proceeds to the processing of step S11. On the other hand, if the destination is outside of the restricted zone, the electronic control unit 20 proceeds to the processing of step S13.

Figure 9:
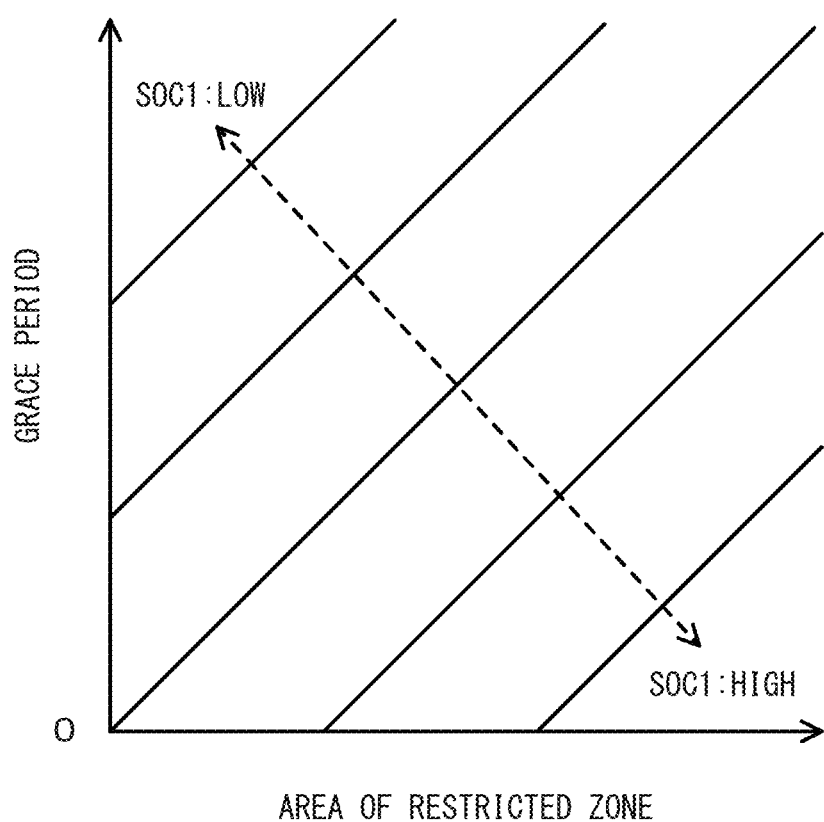
FIG. 9 is a map for setting a mode switching state of charge based on an area of a restricted zone and a grace period from a current time to a time of start of a restricted time period.

At step S13, the electronic control unit 20 for the hybrid vehicle 2 refers to the map shown in FIG. 9 and sets the mode switching state of charge SOC1 based on the area of the restricted zone, one example of the above-mentioned parameter, and the grace period from the current time to the time of start of the restricted time period. As shown in the map of FIG. 9, the broader the area of the restricted zone and, further, the shorter the grace period, the higher the value the mode switching state of charge SOC1 is set to.

The electronic control unit 20 (control device) for the hybrid vehicle 2 according to the present embodiment explained above, in the same way as the first embodiment, is provided with a target state of charge setting part and a running control part.

Further, in the present embodiment, when the current position is inside the restricted zone, the destination is known, and that destination is outside of the restricted zone, the target state of charge setting part is configured to set the mode switching state of charge SOC1 as the target state of charge based on a parameter in a correlative relationship with the battery state of charge required for exit from the inside of the restricted zone to the outside of the restricted zone instead of the remaining distance and the grace period. Specifically, the target state of charge setting part is configured so as to increase the value of the mode switching state of charge SOC1 the greater the battery state of charge required for exiting from inside of the restricted zone to outside of the restricted zone.

Due to this, even if the grace period is short, if the battery state of charge required for exit need only be small, it is possible to set the mode switching state of charge SOC1 at a relatively low value. For this reason, it is possible to increase the running distance in the EV mode, so it is possible to keep the vehicle from becoming unable to run due to the electric power running out while possible to improve the fuel efficiency.

Above, embodiments of the present disclosure were explained, but the above embodiments only show some of the examples of application of the present disclosure. They are not intended to limit the technical scope of the present disclosure to the above embodiments.

For example, in the above embodiments, restricted zone information was acquired from the server 1, but the disclosure is not limited to this. The vehicle storage part 202 of the electronic control unit 20 and other vehicle-mounted storage devices may also store restricted zone information in advance. If a road traffic information communication system center or other such external communication center periodically transmits restricted zone information, the restricted zone information may also be made to be acquired by receiving it from the external communication center.

Further, in the above first embodiment, the mode switching state of charge SOC1 was set based on the remaining distance from the current position of the hybrid vehicle 2 to the restricted zone in which operation of the internal combustion engine 211 is restricted and the grace period from the current time to the time at which restriction of operation of the internal combustion engine 211 is started in the restricted zone. However, the remaining distance may also be replaced with another parameter in a correlative relationship with that remaining distance. As such a parameter, for example, the required time from the current position of the hybrid vehicle 2 to the restricted zone in which operation of the internal combustion engine 211 is restricted may be mentioned. Therefore, as a modification of the first embodiment, it is also possible to set the mode switching state of charge SOC1 based on the required time from the current position of the hybrid vehicle 2 to the restricted zone in which operation of the internal combustion engine 211 is restricted and the grace period from the current time to the time at which restriction of operation of the internal combustion engine 211 is started in the restricted zone.

The invention claimed is:

1. A control device for a hybrid vehicle, the hybrid vehicle comprising:
   an internal combustion engine;
   a battery configured to store electric power generated utilizing power of the internal combustion engine; and
   a rotating electrical machine configured to be driven by being supplied with one or both of electric power generated utilizing power of the internal combustion engine or electric power stored in that battery,
   wherein the control device is configured to:
      set a target battery state of charge;
      control the internal combustion engine and rotating electrical machine and charging and discharging of the battery to make the hybrid vehicle run so that the battery state of charge becomes the target state of charge; and
      set the target state of charge based on a remaining distance or required time from a current position up to a restricted zone in which operation of the internal combustion engine is restricted and a grace period from a current time to a time at which the restriction of operation of the internal combustion engine in the restricted zone is started;
      wherein the control device is further configured to, in response to determining that (i) the current position is inside of the restricted zone and (ii) a destination is outside of the restricted zone, set the target state of charge based on a parameter in a correlative relationship with the battery state of charge required for exiting from inside of the restricted zone to outside of the restricted zone, instead of the remaining distance or the required time, and the grace period.

2. The control device according to claim 1, wherein the control device is further configured to increase a value of the target state of charge as the remaining distance or the required time becomes shorter.

3. The control device according to claim 1, wherein the control device is further configured to:
   make the remaining distance or required time zero in response to determining that the current position is inside of the restricted zone; and
   make a shortest distance from the current position to a geofence between the inside and outside of the restricted zone the remaining distance and make the shortest arrival time until that geofence the required time in response to determining that the current position is outside of the restricted zone.

4. The control device according to claim 1, wherein the control device is further configured to increase a value of the target state of charge as the grace period becomes shorter.

5. The control device according to claim 1, wherein the control device is further configured to increase a value of the target state of charge as the battery state of charge required for exiting from inside of the restricted zone to outside of the restricted zone becomes greater.

6. The control device according to claim 1, wherein the control device is further configured to:
   stop operation of the internal combustion engine and use electric power of the battery to drive the rotating electrical machine in response to the battery state of charge being greater than or equal to the target state of charge; and
   operate the internal combustion engine and use the electric power generated utilizing power of the internal combustion engine to drive the rotating electrical machine and charge the battery in response to the battery state of charge being less than the target state of charge.

7. A control method for a hybrid vehicle, the hybrid vehicle comprising:
   an internal combustion engine;
   a battery configured to store electric power generated utilizing power of the internal combustion engine; and
   a rotating electrical machine configured to be driven by being supplied with one or both of electric power generated utilizing power of the internal combustion engine or electric power stored in that battery,
   wherein the control method comprises:
      setting a target battery state of charge based on a remaining distance or required time from a current position up to a restricted zone in which operation of the internal combustion engine is restricted and a grace period from a current time to a time at which the restriction of operation of the internal combustion engine in the restricted zone is started; and
      controlling the internal combustion engine and rotating electrical machine and charging and discharging of the battery to make the hybrid vehicle run so that the battery state of charge becomes the target state of charge;
      wherein the control device is further configured to, in response to determining that (i) the current position is inside of the restricted zone and (ii) a destination is outside of the restricted zone, set the target state of charge based on a parameter in a correlative relationship with the battery state of charge required for exiting from inside of the restricted zone to outside of the restricted zone, instead of the remaining distance or the required time, and the grace period.

* * * * *